Patented May 31, 1927.

1,631,023

UNITED STATES PATENT OFFICE.

CARL FELDHUSEN, OF BOISE, IDAHO.

FOOD PRODUCT AND METHOD OF MAKING THE SAME.

No Drawing.    Application filed March 25, 1924. Serial No. 701,840.

My invention relates to a new food product, as well as to a novel method of making the same.

In its broad aspect, one object of my invention is to provide a new and useful method of expediting the process of drying skim milk, whole milk or buttermilk, whereby the degree of temperature as well as the time of exposure to the heat of the drying cylinder may be materially decreased.

A more specific object of my invention is to provide a process of drying skim milk, whole milk or buttermilk by the aid of cereal, vegetable or mineral foods, said foods being in such form as to be capable of absorbing the excess moisture contents of the milk and also being adapted to form, in combination with the milk, a valuable food product.

Another object of my invention is to provide a novel method of making a food product, which comprises gelatinizing a food material, mixing the same with a milk-like substance and thereafter drying the mixture. Other objects of my invention will be apparent from the following description and claims.

The methods heretofore employed of drying buttermilk on heated cylinders under atmospheric pressure requires the use of vacuum pans to reduce the water content of the buttermilk from approximately 92½% to about 80% before the buttermilk can be successfuly dried, and even after the moisture content has been reduced to this extent, the varying acidity of the buttermilk frequently prevents the proper drying of the same on heated cylinders.

The prior art methods of drying skimmed or whole milk involve the so-called "spray-drying process," or the use of cylindrical driers operating under a vacuum. Such methods, however, are very expensive and they are only economical when large quantities of milk are available. Moreover, the drying of skimmed milk on heated cylinders under atmospheric pressure is unsatisfactory for the reason that the skimmed milk fails to adhere to the cylinders.

In accordance with my invention, I provide a simple and economical process, whereby such waste products from creameries and dairies as skimmed milk and butter-milk may be quickly dried, without danger of scorching, and formed into a valuable food product adapted for use either as human food or as animal feed, according to the purity and quality of the original ingredients.

To this end, I first form into flakes, meal or flour by cooking and subsequently drying any one or combination of the following materials, namely, cooked potatoes, beans, peas, pumpkins, squashes, sweet potatoes, carrots, rice or corn. Experience has shown that flakes, meal or flour made from vegetables or cereals in which the starch cells have been opened or gelatinized before drying, possess a greater capacity for absorbing water than meal or flour otherwise treated. The dry gelatinized vegetable or cereal flakes, meal or flour is next mixed with skimmed milk, whole milk or buttermilk and applied to the usual drying cylinders in the customary manner. Through this drying operation the moisture has been almost completely removed from the mixture, whereupon the same may be formed as desired for use in the trade.

The above mixture may include an amount of dry gelatinized starchy material approximately equal in weight to the dry matter contained in the buttermilk, whole milk or skimmed milk, that is to say, about eight pounds of said starchy material per one hundred pounds of milk. Satisfactory results, however, have been obtained using from three to fifteen pounds of dry gelatinized starchy material per hundred pounds of milk. When the flaking apparatus includes heated cylinders, as small an amount of starchy material should be used as is necessary to cause a clinching of the aforesaid mixture to the cylinders.

The application of the resulting food product will, of course, depend upon the purity and quality of its ingredients. For instance, it has been used in bread and in pan-cake flour and it is especially valuable as an animal feed for poultry, calves, etc. Attention is directed to the fact that the different ingredients of this food product are more intimately and thoroughly mixed than is possible in a dry mixture, inasmuch as the milk and the gelantinized starchy material are first thoroughly mixed and subsequently baked and dried. Moreover, the addition of the starchy material to the milk permits the use of a much thicker film on the drying cylinders, thereby increasing the capacity of the drying apparatus.

While I have described a number of embodiments of my invention, it is apparent that various changes and modifications may be made without departing from the spirit of my invention and I desire, therefore, that only such limitations shall be imposed thereon as are indicated in the appended claims or as are demanded by the prior art.

I claim:

1. A food product comprising a dried mixture of a cooked starchy material and milk having substantially no butter fat.

2. A food product comprising a dried mixture of a gelatinized, dry food material and milk.

3. A food product comprising a heated mixture of a gelatinized, dry vegetable product and milk having substantially no butter fat.

4. The method of making a food product, which comprises gelatinizing and drying a food material, mixing the same with milk and thereafter drying said mixture on a heated cylinder.

5. The method of making a food product, which comprises gelatinizing and drying a vegetable product, mixing the same with milk and thereafter drying the mixture.

6. The method of drying milk on a member, which comprises mixing the milk with a dry gelatinized substance, applying said mixture to said member, and heating said mixture.

7. The method of treating milk which consists in mixing said milk with gelatinized starch and thereafter applying said mixture to a heated roll.

CARL FELDHUSEN.